US008500164B2

(12) United States Patent
Mendez (10) Patent No.: US 8,500,164 B2
(45) Date of Patent: Aug. 6, 2013

(54) AIRBAG WITH PASSIVE-ACTIVE VENTING (75) Inventor: Gerardo Mendez, West Bloomfield, MI (US)

(73) Assignee: TK Holdings Inc., Auburn Hills, MI (US)

( * ) Notice: Subject to any disclaimer, the term of this patent is extended or adjusted under 35 U.S.C. 154(b) by 113 days.

(21) Appl. No.: 13/182,223

(22) Filed: Jul. 13, 2011

(65) Prior Publication Data
US 2013/0015641 A1 Jan. 17, 2013

(51) Int. Cl.
*B60R 21/239* (2006.01)
(52) U.S. Cl.
USPC .................................. 280/739; 280/743.2
(58) Field of Classification Search
USPC .................. 280/739, 733, 736, 742, 743.2
See application file for complete search history.

(56) References Cited

U.S. PATENT DOCUMENTS

| 6,773,030 | B2 * | 8/2004 | Fischer | 280/739 |
| 6,932,385 | B2 * | 8/2005 | Hawthorn et al. | 280/739 |
| 7,445,237 | B2 * | 11/2008 | Boyle et al. | 280/739 |
| 7,490,854 | B2 * | 2/2009 | Thomas | 280/739 |
| 7,686,333 | B2 | 3/2010 | Choi | |
| 7,883,110 | B2 * | 2/2011 | Pausch | 280/739 |
| 7,954,850 | B2 * | 6/2011 | Fischer et al. | 280/743.1 |
| 8,152,199 | B2 * | 4/2012 | Bauer et al. | 280/739 |
| 2005/0098990 | A1 * | 5/2005 | Pinsenschaum et al. | 280/739 |
| 2005/0225065 | A1 * | 10/2005 | Fujll | 280/743.2 |
| 2007/0228709 | A1 | 10/2007 | Khouri | |
| 2008/0007038 | A1 * | 1/2008 | Fischer et al. | 280/743.2 |
| 2008/0179866 | A1 * | 7/2008 | Maertens | 280/739 |
| 2008/0203713 | A1 * | 8/2008 | McFadden et al. | 280/739 |
| 2008/0290638 | A1 * | 11/2008 | Sahm et al. | 280/743.1 |
| 2012/0153603 | A1 * | 6/2012 | Mallinger et al. | 280/739 |

OTHER PUBLICATIONS

International Search Report PCT/US2012/044972 dated Dec. 14, 2012.

* cited by examiner

*Primary Examiner* — Faye M Fleming
*Assistant Examiner* — James English
(74) *Attorney, Agent, or Firm* — Foley & Lardner LLP (57) ABSTRACT

According to an exemplary embodiment, an airbag system includes an airbag cushion, a housing, an inflator, a latch mechanism, and a valve panel. The airbag cushion defines an inlet and a chamber. The house is coupled to the airbag cushion generally proximate the inlet. The inflator is coupled to the housing and is in fluidic communication with the inlet. The latch mechanism is coupled to the housing. The valve panel has a first end coupled to the airbag cushion generally opposite the inlet and includes a second end releasably coupled to the latch mechanism. The airbag cushion includes one or more vent apertures through a surface thereof. The valve panel includes one or more valve apertures and is disposed in the chamber generally adjacent the surface of the airbag cushion. The valve panel is configured to slide relative to the airbag cushion from a first position to a second position before being released by the latch mechanism to move to a third.

21 Claims, 9 Drawing Sheets

AIRBAG WITH PASSIVE-ACTIVE VENTING

BACKGROUND

The present disclosure relates to airbags. More particularly, the present disclosure relates to airbags that protect occupants of motor vehicles in the event of an accident.

Airbag modules or systems (e.g., side-impact, front-impact) are located in vehicles to restrain or otherwise protect occupants (e.g., driver, passenger) from impact or injury during a dynamic vehicle event (e.g., a front-impact, a side-impact, a rollover event, etc.). Airbag systems typically include an inflatable airbag cushion and an inflator. Upon detection or occurrence of a dynamic event, the inflator is triggered to release or otherwise produce inflation gas that is routed into the airbag cushion. The inflated airbag cushion may restrain the occupant and/or provide a protective barrier between to prevent impact between portions of the occupant (e.g., torso, head, neck, knees, etc.) and surfaces or objects of the vehicle (e.g., doors, dashboard, steering wheel, pillars, etc.). More particularly, inflators may be pyrotechnics or compressed air devices which generate or release inflation gas at a high volumetric flow rate, such that the airbag cushion is rapidly inflated.

Airbag cushions may be stored within and deployed from many locations in the vehicle. For example, airbag cushions may be disposed within housings located in a vehicle's dashboard or instrument panel, steering wheel or steering column, seats, pillars, or headliners. Airbag cushions are typically packaged for storage through a process involving folding, rolling, or a combination thereof to compact the airbag in order for it to fit into the small storage volume (e.g., a portion of the seat back of a seat system) containing the stored airbag cushion.

Airbag cushions may also employ venting to control inflation of the airbag according to various parameters. For example, fixed vents may be normally open to control release of inflation gas according to the particular application (e.g., vehicle, position within the vehicle, etc.) and characteristics of the airbag system (e.g., inflator, airbag shape, airbag size, etc.). Vents may also be provided that open or close according to various considerations. For example, active venting may be provided to open or close one or more vents during deployment of the airbag. Active venting requires actuation of a mechanism or other device after deployment of the airbag (i.e., after triggering the inflation device). Passive venting may instead be provided to open or close one or more vents during deployment of the airbag. Passive venting, instead of employing some controlled device, utilizes the physical state of an airbag cushion to open or close the vents, such as vents that open upon the airbag cushion encountering an occupant, or tethers that open or close vents upon inflation of the airbag cushion to a certain degree.

The aforementioned airbag systems, however, often suffer from various disadvantages. For example, airbag systems may be limited in their ability to account for varying conditions, such as occupants of different size or seated in different positions.

SUMMARY

According to an exemplary embodiment, an airbag system includes an airbag cushion, a housing, an inflator, a latch mechanism, and a valve panel. The airbag cushion defines an inlet and a chamber. The house is coupled to the airbag cushion generally proximate the inlet. The inflator is coupled to the housing and is in fluidic communication with the inlet. The latch mechanism is coupled to the housing. The valve panel has a first end coupled to the airbag cushion generally opposite the inlet and includes a second end releasably coupled to the latch mechanism. The airbag cushion includes one or more vent apertures through a surface thereof. The valve panel includes one or more valve apertures and is disposed in the chamber generally adjacent the surface of the airbag cushion. The valve panel is configured to slide relative to the airbag cushion from a first position to a second position before being released by the latch mechanism to move to a third position.

According to an exemplary embodiment, an airbag cushion includes first and second cushion panels and a generally elongate valve panel. The first and second cushion panels are coupled together to define an inlet and a chamber. The valve panel is disposed within the chamber and is positioned generally adjacent an interior surface of the first cushion panel. The valve panel has a first end coupled to the first cushion panel generally opposite the inlet and a second end configured to be releasably coupled to a vehicle. The valve panel also includes one or more valve apertures extending therethrough. The first cushion panel includes one or more vent apertures. The valve panel is configured to move relative to the first cushion panel from a first position to a second position before being released from the vehicle to move to a third position. The first position is different from the second position, and the second position is different from the third position.

DETAILED DESCRIPTION

Figure 1:
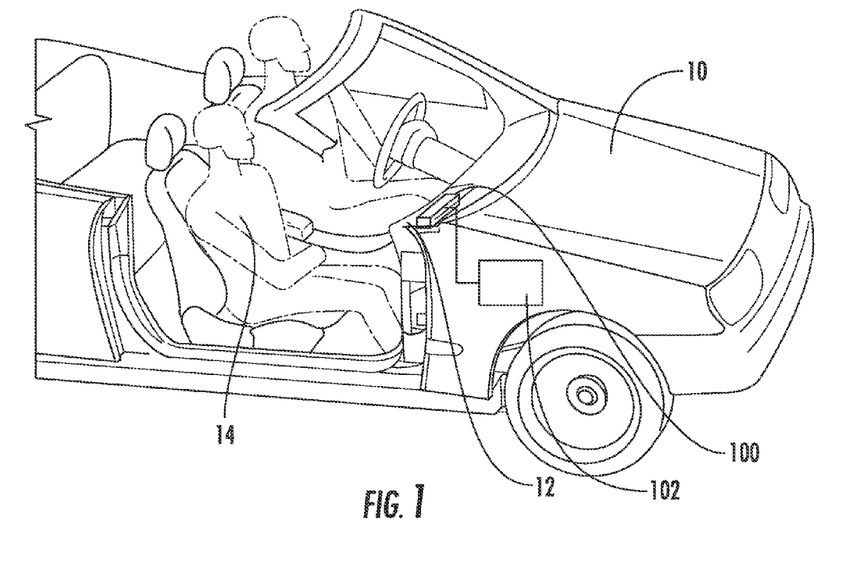
FIG. 1 is a perspective view of an automobile having an airbag system according to an exemplary embodiment.
Figure 2:
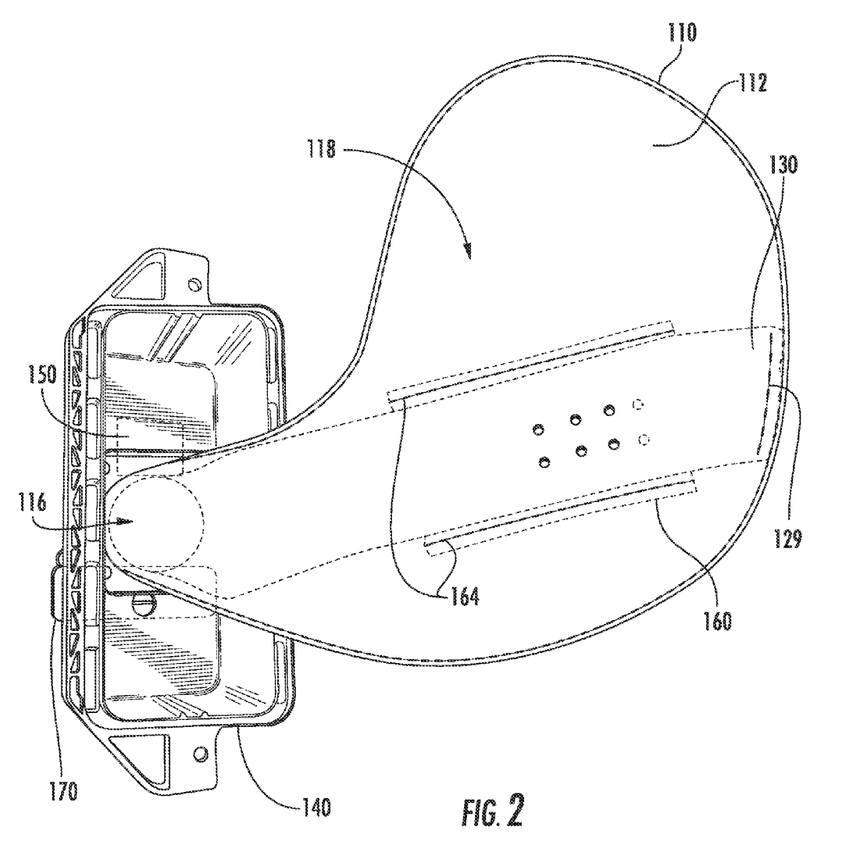
FIG. 2 is a perspective view of an airbag system with a deployed airbag cushion according to an exemplary embodiment.

Referring to FIG. 1-2, according to an exemplary embodiment, a motor vehicle 10 includes an airbag system 100. The airbag system 100 generally includes an airbag cushion 110 disposed in a housing 140 that is positioned between an occupant 14 and a reaction surface 12 of the vehicle 10, such as an instrument panel, headliner, pillar, etc. The airbag system 100 is typically hidden from view, such as behind a panel of the instrument panel, trim piece in the roof or pillar, or beneath the fabric of a seat. An inflator 150 is arranged in fluidic communication with the airbag cushion 110, such that, when triggered, the inflator 150 discharges inflation gas to rapidly inflate the airbag cushion 110. A control system 102 is provided for the airbag system 100 that triggers the inflator 150 upon detection of certain predetermined conditions, such as a rapid deceleration or acceleration event and/or characteristics of the occupant. Such predetermined conditions may be detected by sensors included with the airbag system 100 or controller 102, or the sensors may be part of other detection or control systems of the motor vehicle 10. When deployed, the airbag cushion 110 rapidly inflates away from the reaction surface 12 to protect the occupant 14 from injury from impact with various surfaces or objects of the motor vehicle 10.

The airbag system 100 is configured to operate in various stages to provide improved safety for occupants as compared to conventional airbags. More particularly, the airbag system 100 and airbag cushion 110 are configured to change venting characteristics in various stages of deployment. Prior to deployment and during an initial stage of deployment, the venting is in an open configuration. The venting being initially open allows the airbag cushion 110 to better accommodate out-of-position occupants and other non-standard occupants. If the airbag cushion 110 encounters such an occupant, the venting is configured to remain open to lessen the impact between the airbag cushion 110 and occupant and/or otherwise accommodate the occupant. If the occupant is normally seated, the airbag cushion 110 is configured to proceed to an intermediate stage, wherein the venting is closed such that the airbag cushion 110 rapidly inflates or expands toward the occupant. During a final stage, the venting is again opened to soften the airbag for ride down of the passenger Referring now to FIG. 2-3, according to an exemplary embodiment, the airbag cushion 110 includes first and second cushion panels 112, 114. The first and second cushion panels 112, 114 are made of a flexible sheet-like material, such as coated or uncoated woven nylon, and are coupled to each other, such as by stitching, adhesives, welding, etc., or a suitable combination thereof. Collectively, the first and second cushion panels 112, 114 define the airbag cushion 110 to have an inlet 116 and an interior chamber 118. The first and second cushion panels 112, 114 may, for example, be upper and lower panels. The inlet 116 is configured to couple to the housing 140 and to route inflation gas from the inflator 150 to the interior chamber 118. The interior chamber 118 is configured to receive the inflation gas so as to rapidly inflate and expand away from the reaction surface 12 of the vehicle 10. According to other exemplary embodiments, the airbag panels may be provided in different quantities (e.g., one or three or more), different orientation (e.g., left and right panels, panels with different or varying shape, the same or different size, etc.), may be made from different materials, may be coupled together in different manners (e.g., welding, adhesives, or any other suitable method or combination of methods), and the like in any suitable combination to form the airbag cushion 110 as described herein. As discussed in further detail below, the airbag cushion 110 also includes a vent panel 130 and a guide panel 160 that, along with the first cushion panel 112, are configured to provide active and passive venting of the airbag cushion 110 during various stages of deployment.

Figure 3:
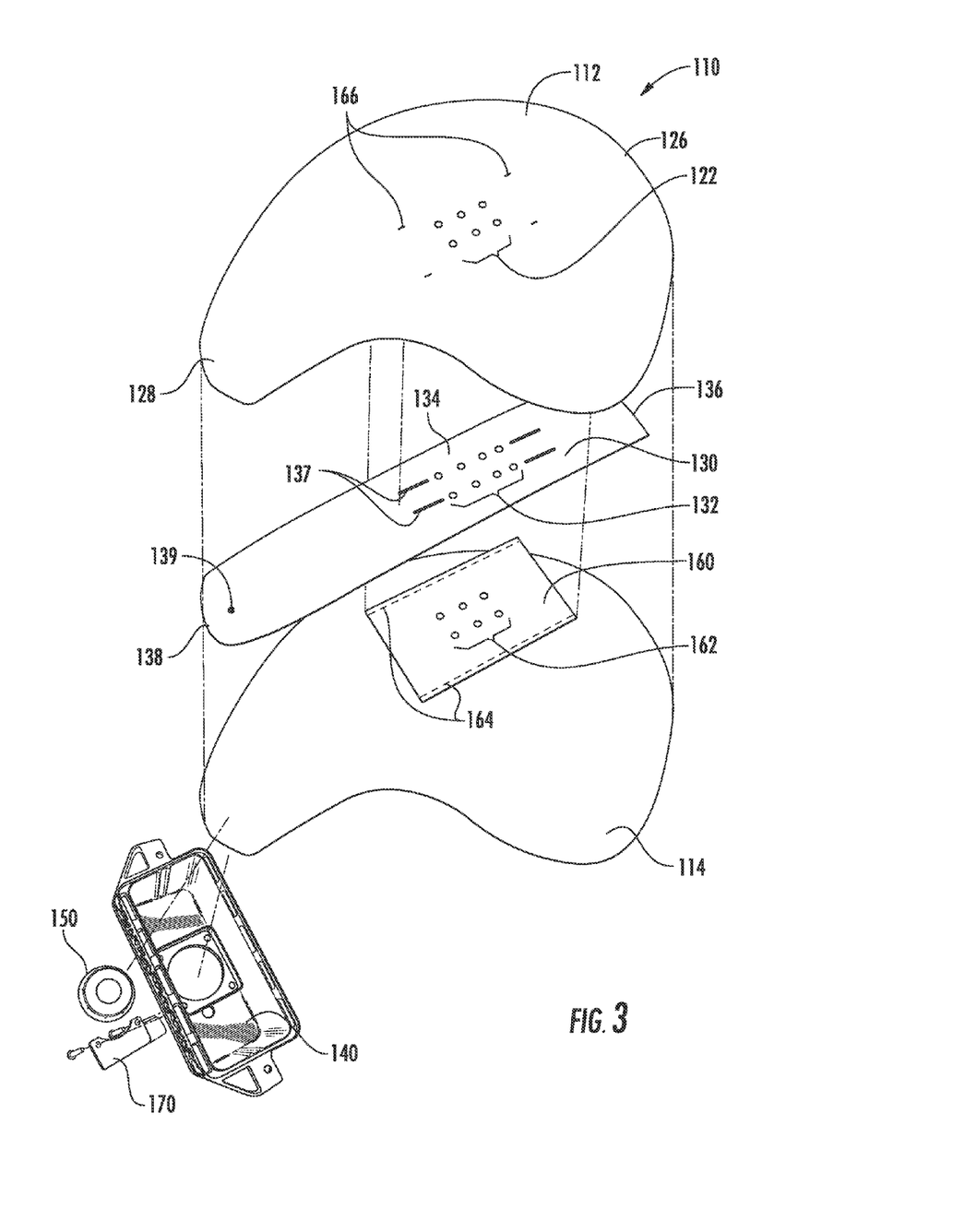
FIG. 3 is an exploded perspective view of an airbag system according to an exemplary embodiment.

According to an exemplary embodiment, the airbag system 100 includes the housing 140. The housing 140 is an injection molded, plastic box. The housing 140 defines a generally open compartment configured to hold the airbag cushion 110 in an undeployed or folded state. The housing 140 is coupled by fasteners or other means to the vehicle 10 in an inconspicuous manner, such as under a portion of the instrument panel. A bottom surface of the compartment provides a reaction surface from which the airbag cushion 110 may inflate or expand when deployed. The housing 140 may also include structural features such as ribs, protrusions, or recesses configured to strengthen the housing 140 to withstand the forces associated with deployment of the airbag cushion 110. According to other exemplary embodiments, the housing 140 may be made from different materials (e.g., other plastics, composites, metals, metal alloys, combinations thereof, etc.), may be made according to different manufacturing methods (e.g., blow molding, stamping, etc.), may have different configurations (e.g., multiple pieces, shallower, deeper, wider, narrower, irregular geometry, different strengthening features, etc.).

According to an exemplary embodiment, the housing 140 is configured to couple to the airbag cushion 110 and enable communication of inflation gas from the inflator 150 to the inlet 116 of the airbag cushion 110. The housing 140 includes a stamped, metal flange that generally surrounds an aperture in the bottom surface of the housing 140. The flange may be coupled to the bottom surface of the housing 140, such as with fasteners. The flange provides a surface extending away from the bottom surface to which the inlet 116 of the airbag cushion 110 may be coupled, such as with fasteners and/or adhesives, so as to retain the airbag cushion 110 to the housing 140 before, during, and after deployment. The aperture is a generally round hole that extends through the bottom surface of the housing 140. The aperture is in fluidic communication with the inflator 150, such that inflation gas released by the inflator 150 may pass through the aperture and into the airbag cushion 110. According to other exemplary embodiments, the flange may be made from different materials (e.g., other metals, metal alloys, plastic, composites, or any suitable combination thereof), may be made according to other manufacturing methods (e.g., injection molding, extruding, machining, integral formation with the housing 140, etc.), may have different configuration (e.g., different shape or geometry, multi-piece, etc.), and the like.

According to an exemplary embodiment, the inflator 150 is configured to release inflation gas so as to rapidly inflate the airbag cushion 110. The inflator 150 may be a pyrotechnic or compressed gas device, or any other device suitable for use in a motor vehicle. The inflator 150 may further be of any geometry (e.g., disk-shaped, cylinder-shaped, etc.) suitable for various parameters of the airbag system 100 and vehicle 10 (e.g., packaging, reliability, performance, manufacturing and assembly, etc.). The inflator 150 is configured to be triggered upon detection of a dynamic vehicle event, such as with an airbag controller 102 and/or a vehicle controller capable of triggering or otherwise causing the inflator to release or produce inflation gas.

As referenced above, according to an exemplary embodiment, passive and active venting for the various stages of deployment is provided cooperatively by the airbag cushion 110, the valve panel 130, the guide panel 160, and a latch mechanism 170. Inflation of the airbag cushion 110 pulls the valve panel 130, causing it to slide relative to the first cushion panel 112 and the guide panel 160. As the valve panel 130 slides, valve apertures 132 on the valve panel 130 come into and out of alignment with the vent and guide apertures 122, 162 on the first cushion panel 112 and guide panel 160, respectively. In this manner, venting of the airbag cushion 110 is opened or close to allow or prevent the release of inflation gas from the airbag cushion 110.

Figure 7:
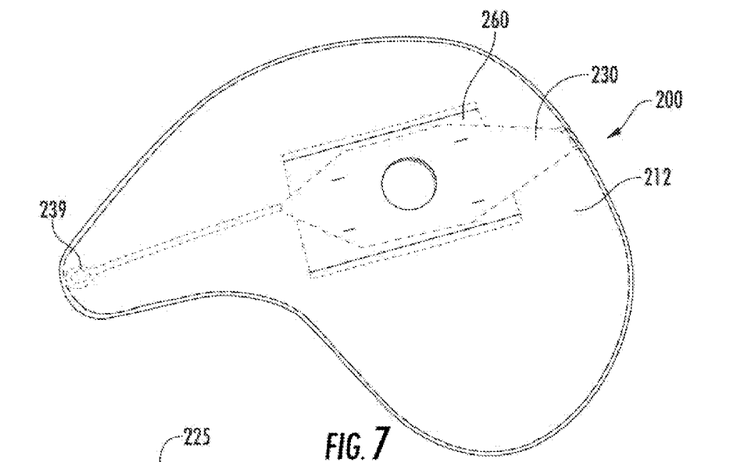

According to an exemplary embodiment, the valve panel 130 is generally elongate having a first end 136 arranged distally or away from the airbag housing 140, a second end 138 arranged proximally or closer to the airbag housing 140 than the distal end 136, and a middle portion 134 arranged between the first end 136 and second end 138. The first end 136 of the valve panel 130 is coupled to a first end 126 of the airbag cushion 110, such as by stitching or welding 129 during coupling of the first and second airbag panels 112, 114 to each other. The second end 138 of the valve panel 130 includes a latch aperture 139 that is releasably coupled to the latch mechanism 170, which is disposed on or adjacent the housing 140 near a second end 128 of the first cushion panel 112 or may be coupled directly to the vehicle 10. The second end 138 may otherwise be releasably coupled to the vehicle 10 in a fixed position. The middle portion 134 is disposed generally against the first cushion panel 112 inside the chamber 118, such as with the guide panel 130 discussed below, and is configured to slide relative to the first cushion panel 112. According to other exemplary embodiments, any other suitable means may be used (e.g., straps, guides, channels, etc.) that is sufficient to allow the valve panel 130 to slide relative to and be disposed generally against the first cushion panel 112. The valve panel 130 may be made from the same material as the first and second cushion panels 112, 114, may include additional material such as straps (shown in FIG. 7), or any other suitable material, may be disposed exterior to the airbag cushion 110 or chamber 118, may be coupled to the airbag cushion 110 and/or latch mechanism 170 or vehicle at different locations, and/or may include a latch aperture 239 provided by other means, such as a loop or ring.

The guide panel 160 is coupled to the first cushion panel 112 to define a passage through which the valve panel 130 may slide. For example, the guide panel 160 may be coupled to the first cushion panel 112, such as with generally parallel stitching or welding 164 spaced apart slightly wider than the width of the middle portion 136 of the valve panel 130. The guide panel 160 may also include additional features to ensure proper alignment of the valve panel 130 with the first cushion panel 112. For example, stitches 166 may also be provided, which couple the guide panel 160 to the first airbag panel 112 and correspond to guide slots 137 cut in the middle portion 134 of the valve panel 130 to help ensure proper alignment. Instead, or additionally, the stitches 166 may be configured as tear away stitches to couple the valve panel 130 to the guide panel 160 to hold the valve panel 130 in a fixed position relative to the first cushion panel 110 prior to deployment, despite any relative movement that may otherwise occur because of folding, packaging, or any other cause. The guide panel may be made from the same material as the first and second cushion panels 112, 114, or any other suitable material, such as other types of woven, extruded, or other sheet materials.

As referenced above, according to an exemplary embodiment, the first cushion panel 112, valve panel 130, and guide panel 160 each include on surfaces thereof one or more corresponding vent, valve, and guide apertures 122, 132, 162, respectively, which are configured in a complementary manner to allow the controlled release of inflation gas from the airbag cushion 110 during various stages of deployment. More particularly, the vent apertures 122 and valve apertures 132 are complementary to each other, such that as the valve panel 130 slides relative to the first cushion panel 112, the valve apertures 132 may generally align with the vent apertures 112 to allow passage of inflation gas from the chamber 118 of the airbag cushion 110, or continuous portions of valve panel 130 material may generally cover the vent apertures 122 to block or otherwise hinder passage of inflation gas through the vent apertures 122. The guide apertures 162 are complementary to the vent apertures 122 and valve apertures 132, such that when the valve apertures 132 come into alignment with the vent apertures 122, the guide apertures 162 also allow passage of inflation gas through the vent apertures 122. The vent, valve, and guide apertures 122, 132, 162 may be of any sufficient number, shape, size, position, etc., each such characteristic being configured according to the venting requirements of a particular airbag or application and may or may not be the same for each type of aperture (i.e., the vent, valve, and guide apertures 122, 132, 162 may be of different number, shape, size, and/or orientation for the same airbag cushion 110).

As shown in FIG. 2-6, according to one exemplary embodiment, the first cushion panel 112 includes six vent apertures 122 that are approximately 1 inch in diameter and are spaced at regular intervals of approximately four inches in a 3×2 box pattern. The guide panel 160 includes six guide apertures 162 of the same size and orientation as the first cushion panel 112, the guide panel 160 being fixedly coupled to the first cushion panel 112 with the guide apertures 162 being held in fixed alignment with the vent apertures 122. The valve panel 130 includes eight valve apertures 132 arranged in a 4×2 pattern of the same size and orientation as the first cushion panel 112. Before deployment and during the initial stage of deployment, the valve panel 130 is configured to be in a first position (shown in FIGS. 2, 4A-4C) relative to the first cushion panel 112 to allow venting (i.e., the valves are normally open). In the first position, the six valve apertures 132 positioned closest to the first end 136 of the valve panel 130 are aligned with the six vent apertures 122 and the six guide apertures 162. Between the initial stage of deployment and an intermediate stage of deployment, the valve panel 130 is configured to move to a second position (shown in FIG. 5A-5B) to prevent venting (i.e., the valves are closed). In the second position, continuous portions of the valve panel material 130 between the valve apertures 132 generally cover the vent and guide apertures 122, 162 (i.e., the valve apertures 132 moved distally or away from the airbag housing 140 relative to the vent and guide apertures 122, 162). Between the intermediate stage of deployment and a final stage of deployment, the valve panel 130 is also configured to actively move to a third position (shown in FIG. 6A-6B) to allow venting (i.e., the valves are opened). In the third position, the six valve apertures 132 positioned closest to the second end 138 of the valve panel 130 are aligned with the vent and guide apertures 122, 162 (i.e., the valve apertures 132 again moved distally or away from the airbag housing 140 relative to the vent and guide apertures 122, 162).

According to an exemplary embodiment, the valve panel 130 and first cushion panel 112 are configured, such that the valve panel 130 passively or actively moves relative to the first cushion panel 112 during various stages of deployment. More particularly, the valve panel 130 and first cushion panel 112 are configured to have slack relative to each other in the first and second position, such that inflation of the airbag cushion 110 causes the valve panel 130 and first cushion panel 112 to move relative to each other.

Figure 4A:
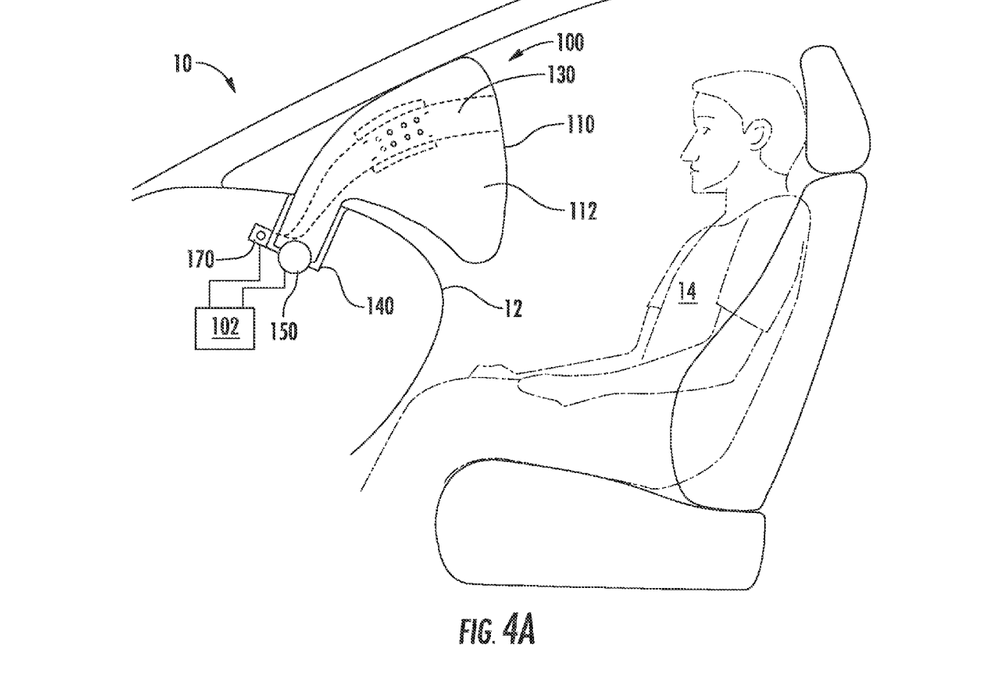
FIG. 4A is a side, partial cross section view of an automobile with an airbag deployed in a first stage according to an exemplary embodiment.
Figure 4B:
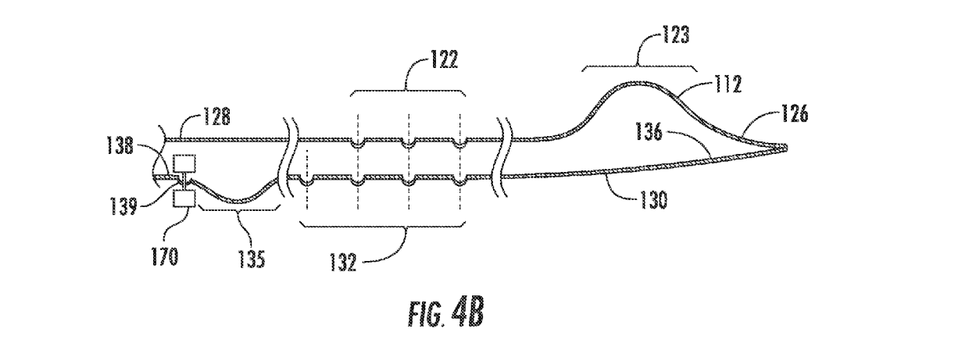
FIG. 4B is a partial, cross section exploded view of an airbag cushion in a first stage according to an exemplary embodiment.
Figure 4C:
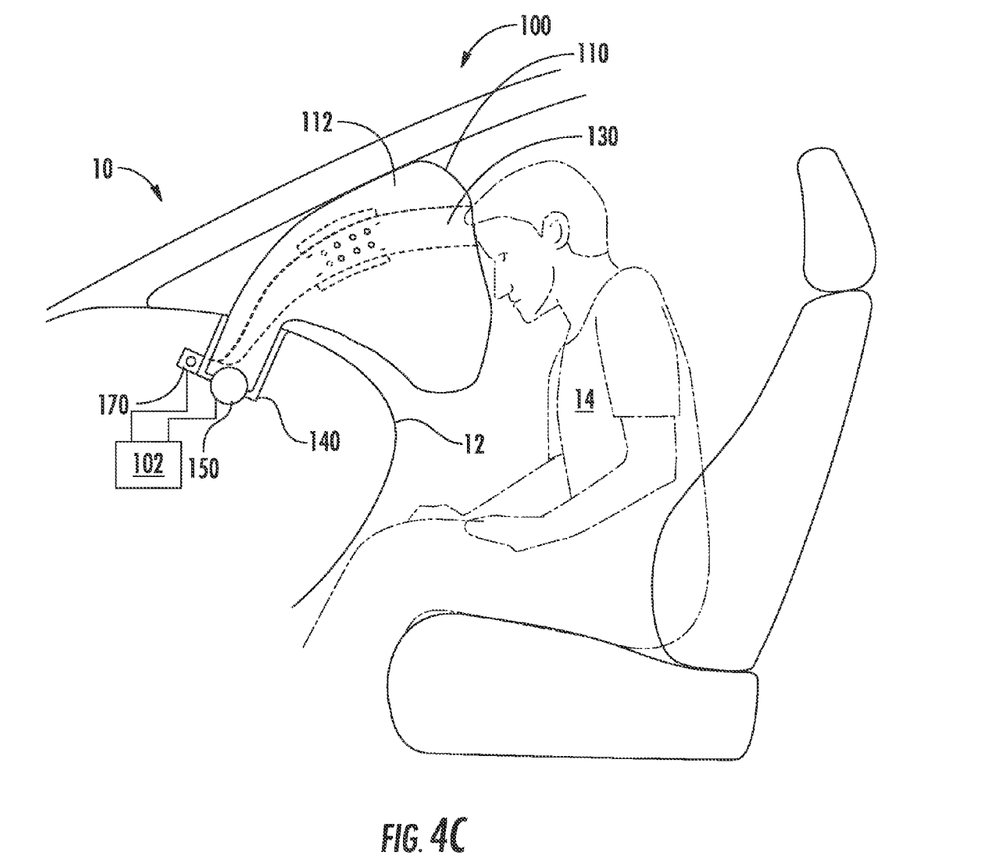
FIG. 4C is a side, partial cross section view of an automobile with an airbag deployed in a first stage according to an exemplary embodiment and with an out-of-position occupant.

FIGS. 4A and 4C depict a vehicle 10 with an airbag cushion 110 in the first stage of deployment according to an exemplary embodiment; FIG. 4B depicts the relative positions of the first cushion panel 112, vent panel 130, vent apertures 122, and valve apertures 132 during the first stage of deployment. The valve panel 130 is in the first position, the venting is normally open (i.e., the vent, valve, and guide apertures 122, 132, 162 are aligned). Between the apertures 122, 132 and the first ends 126, 136, the first cushion panel 112 has more material than the valve panel 130 (i.e., the first cushion panel 112 has slack generally indicated by reference numeral 123). Between the apertures 122, 132 and the second ends 128, 138, the valve panel 130 has more material than the first cushion panel 110 (i.e., the valve panel 130 has slack generally indicated by reference numeral 135). The slack 123 in the first cushion panel 112 is more than the slack 135 in the valve panel 130. For example, the slack 123 in the first cushion panel 112 may equal approximately the spacing intervals of the valve and vent apertures 132, 122, and the slack 135 in the valve panel 130 may equal approximately half the spacing interval of the apertures 132, 122. According to other exemplary embodiments, the valve panel 130, slack in the valve panel 135, and/or slack 223 in the first cushion panel 112 may be configured in other manners sufficient to provide the venting described herein.

Figure 5A:
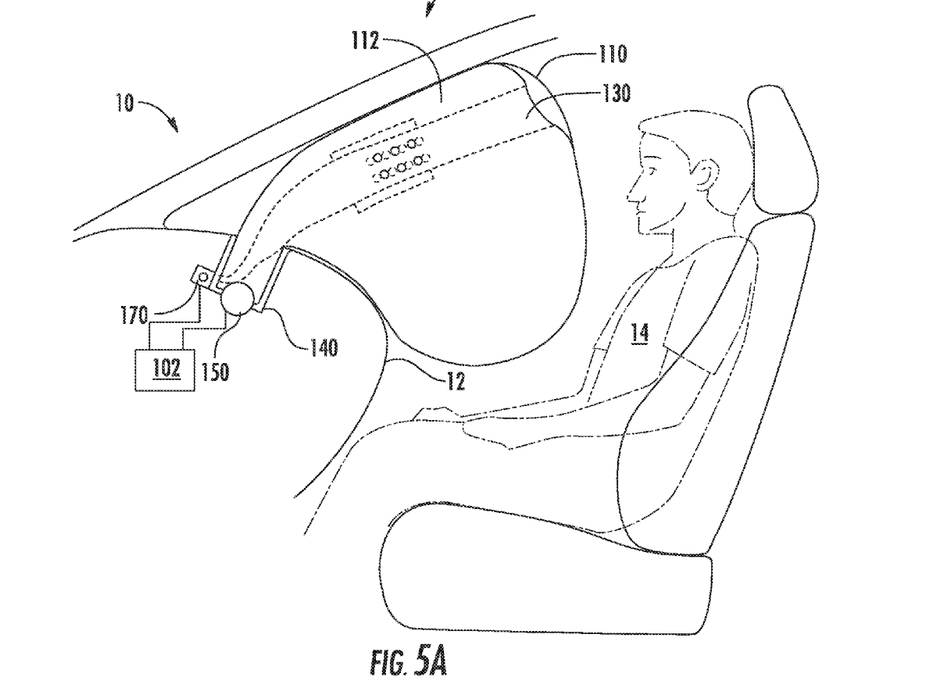
FIG. 5A is a side, partial cross section view of an automobile with an airbag deployed in a second stage according to an exemplary embodiment.
Figure 5B:
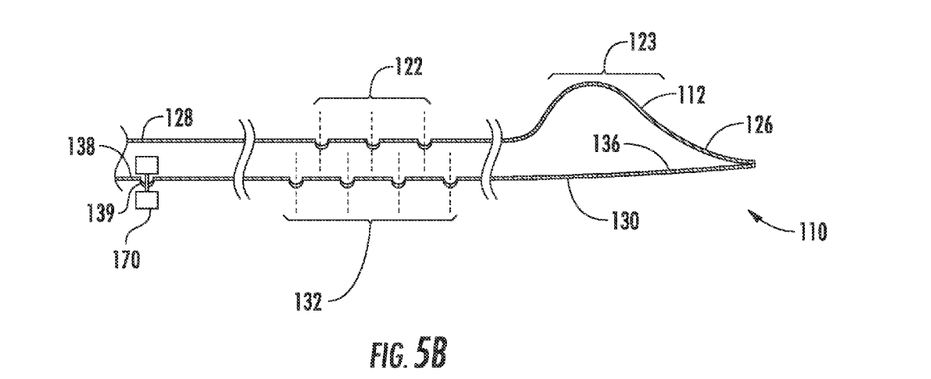
FIG. 5B is a partial, cross section exploded view of an airbag cushion in a second stage according to an exemplary embodiment.

FIG. 5A depicts a vehicle 10 with an airbag cushion 110 in the second stage of deployment according to an exemplary embodiment; FIG. 5B depicts the relative positions of the first cushion panel 112, vent panel 130, vent apertures 122, and vale apertures 132 during the second stage of deployment. Between the first stage of deployment and the intermediate stage of deployment, the valve panel 130 is configured to move from the first position to the second position. The airbag cushion 110 inflates and pulls on the valve panel 130, thus sliding the valve panel 130 into the second position where the venting is closed to enable the airbag cushion 110 to rapidly inflate toward an occupant during the intermediate stage of deployment. More particularly, the valve panel 130 is pulled by the airbag cushion 110, thus causing the valve panel 130 to slide distally or away from the airbag housing 140 relative to the first cushion panel 112. Substantially all of the slack 135 in the valve panel 130 is removed, such that the valve panel 130 is held in tension between its first end 136 and second end 138, which are coupled to the first end 126 of the first cushion panel 112 and the latch mechanism 170, respectively. Because the first cushion panel 112 had more slack 123 (i.e., between its first end 126 and the vent apertures 122) than the valve panel 130 (i.e., between its second end 138 and valve apertures 132) in the first position, the first cushion panel 112 continues to have slack 123 in the second position. This automatic closing of the vents, which occurs due to inflation of the airbag cushion 110, is generally referred to herein as passive venting.

FIG. 4C depicts the airbag cushion 110 encountering an occupant during the first stage of deployment. If the airbag cushion 110 encounters an occupant out-of-position or other atypical occupant during the first stage of deployment, the venting of the airbag cushion 110 is configured to remain open (i.e., the valve panel 130 remains in the first position and the intermediate stage of deployment is not reached). Because the airbag cushion 110 encounters the occupant, the venting is configured to release inflation gas before the airbag cushion 110 can inflate sufficiently to pull on the valve panel 130 to close the venting. By configuring the venting to remain open upon encountering an occupant during the first stage of development, the airbag cushion 110 may be configured to better accommodate various occupant seating configurations. Because closing the vents is dependent upon the airbag cushion 110 expanding to a certain degree (i.e., to pull on the valve panel 130), this type of venting is referred to as passive venting.

Figure 6A:
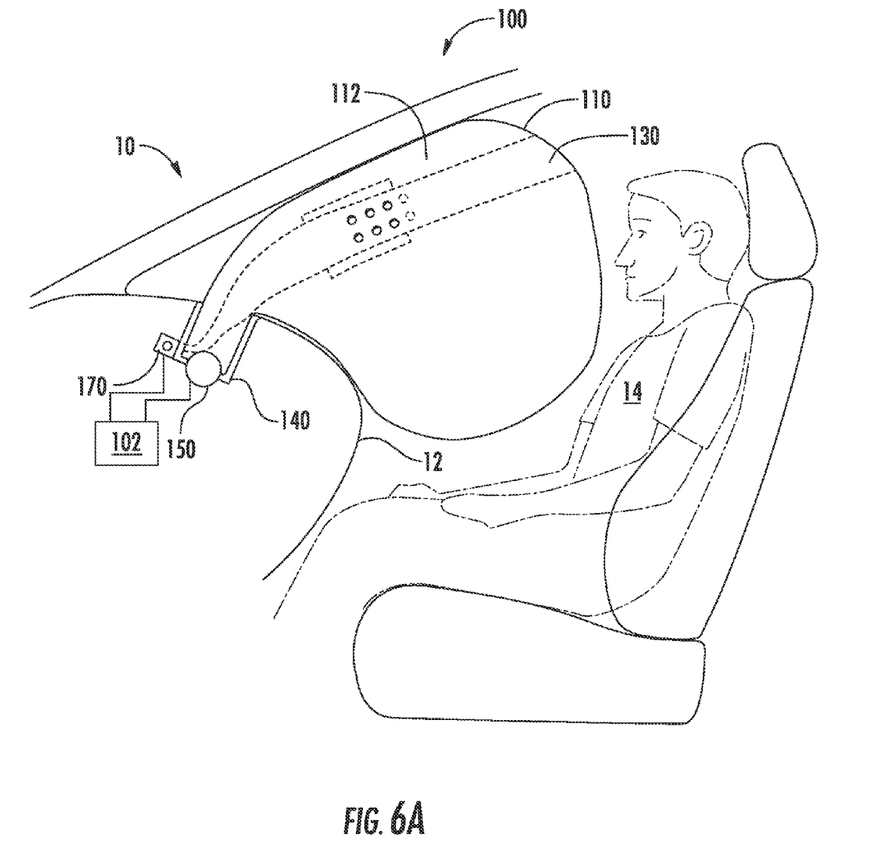
FIG. 6A is a side, partial cross section view of an automobile with an airbag deployed in a third stage according to an exemplary embodiment.
Figure 6B:
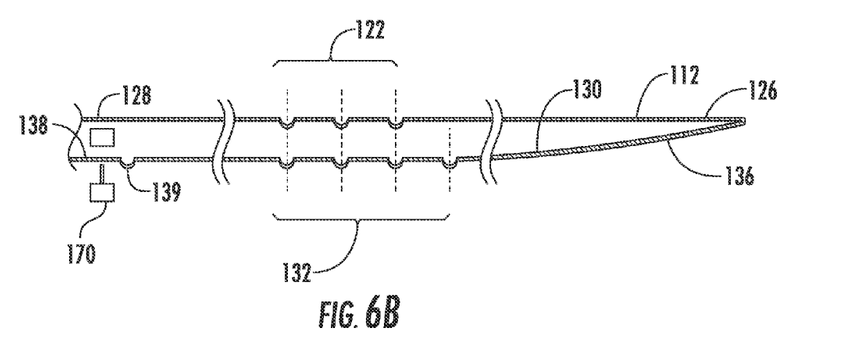
FIG. 6B is a partial, cross section exploded view of an airbag cushion in a third stage according to an exemplary embodiment.
Figure 6C:
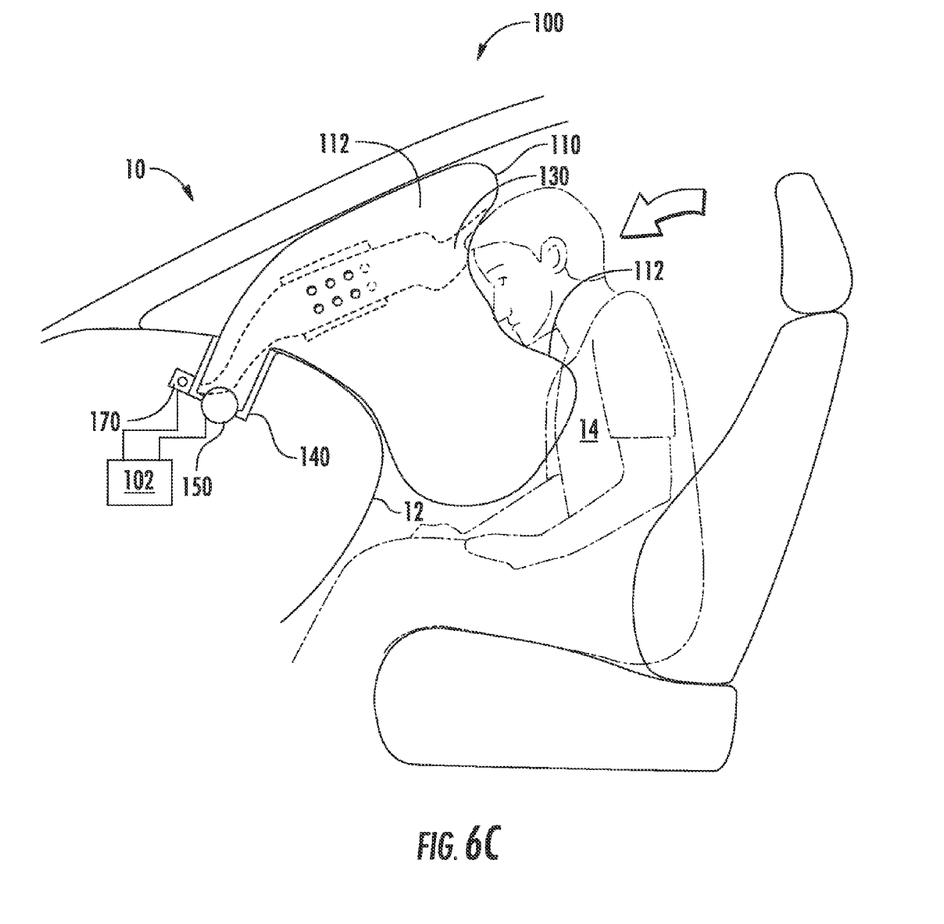
FIG. 6C is a side, partial cross section view of an automobile with an airbag deployed in FIG. 7 is a perspective view of an airbag cushion according to an exemplary embodiment.

FIGS. 6A and 6C depict a vehicle 10 with an airbag cushion 110 in the third or final stage of deployment; FIG. 6B depicts the relative positions of the first cushion panel 112, vent panel 130, vent apertures 122, and valve apertures 132. Between the intermediate stage of deployment and the final stage of deployment, the valve panel 130 is configured to move from the second position to the third position. The control system 102 triggers the latch mechanism 170 to release the second end 138 of the valve panel 130, thus allowing the airbag cushion 110 to continue to inflate and remove the remaining the slack from the first cushion panel 112. As the slack is removed, the airbag cushion 110 continues to pull on the first end 136 of the valve panel 130, thus sliding the valve panel 130 into the third position where the venting is open. More particularly, the valve panel 130 is pulled by the airbag cushion 110, thus causing the valve panel 130 to slide distally or away from the airbag housing 140 relative to the first cushion panel 112. As shown in FIG. 6C, by providing open venting during the final stage of deployment, the airbag cushion 110 may more rapidly release inflation gas to provide ride down for the occupant. This controlled opening of the venting, which occurs upon the controlled or triggered release of the valve panel 130 by the latch mechanism 170, is generally referred to herein as active venting.

The control system 102 functions to trigger the inflation device 150 so as to inflate the airbag cushion 110. The control system 102 may include its own sensors, such as to detect an impact event, collision, or characteristics of occupants, may process signals from sensors disposed elsewhere in the vehicle, or any combination thereof. Further, the control system 102 also functions to trigger the latch mechanism 170 to release the second end 138 of the valve panel 130. The control system 102 may, for example, determine whether and when to release the valve panel 130 based on various criteria, such as vehicle speed, vehicle deceleration, occupant size, occupant position, inflation speed, stage of inflation, expected timing of occupant impact with the airbag cushion 130, stage of deployment or position of the valve panel 130 at expected impact of the occupant with the airbag cushion 130, any other suitable criteria, or any suitable combination thereof. Furthermore, the size, shape, and position of the first cushion panel 112, valve panel 130, and apertures 122, 132, 162 may additionally be configured to optimize the inflation and venting characteristics of the airbag cushion 110 according to various criteria, such as vehicle characteristics, passenger characteristics, etc.

As shown in FIG. 7-10, according to another exemplary embodiment, the first cushion panel 212, valve panel 230, and guide panel 260 each include a single, approximately 2.75 inch diameter vent, valve, or guide aperture 222, 232, 262, respectively. Prior to deployment and during the initial stage of deployment, the valve panel 230 is in a first position relative to the first cushion panel 212 such that the vent, valve, and guide aperture 222, 232, 262 are aligned to allow venting. Between the initial stage of deployment and an intermediate stage of deployment, the valve panel passively moves to a second position to prevent venting (i.e., the valve is closed). In the second position, continuous portions of the valve panel 230 material between the valve aperture 232 and the first end 236 generally cover the vent and guide apertures 222, 262 (i.e., the valve aperture 232 moved proximally or closer to the airbag housing 240 relative to the vent and guide apertures 222, 262). Between the intermediate stage of deployment and the final stage of deployment, the valve panel is configured to actively move back to the first position to allow venting (i.e., the valve aperture 232 moves distally or away from the airbag housing 240 to reopen the valve). According to other exemplary embodiments, the vent, valve, and guide apertures 122, 132, 162 may be between approximately 50 mm and 90 mm in diameter.

Figure 8:
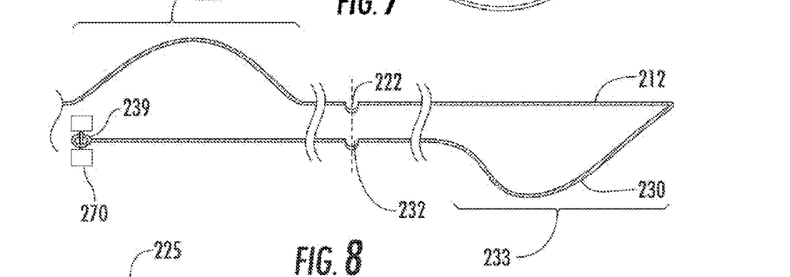
FIG. 8 is a partial, cross section exploded view of an airbag cushion in a first stage according to an exemplary embodiment.

FIG. 8 depicts the relative positions of the first cushion panel 212, valve panel 230, vent aperture 222, and valve aperture 232 during the first stage of deployment. The valve panel 230 is in the first position, such that the venting is normally open. Between the 222, 232 and the first ends 226, 236, the valve panel 230 has more material than the first cushion panel 212 (i.e., the valve panel 230 has slack 233). Between the apertures 222, 232 and the second ends 228, 238 of the first cushion panel 212 and the valve panel 230, respectively, the first cushion panel 212 has more material than the valve panel 230 (i.e., the first cushion panel 212 has slack 225). The slack 225 in the first cushion panel 212 is more than the slack 233 in the valve panel 230. For example, the slack 233 in the valve panel 230 may be more than the diameter of the vent and valve apertures 222, 232, and the slack 225 in the first cushion panel 212 may be approximately the diameter of the apertures 222, 232 more than the slack 233 in the valve panel 230. According to other exemplary embodiments, the valve panel 230, slack in the valve panel 233, and/or slack 225 in the first cushion panel 212 may be configured in other manners sufficient to provide the venting described herein.

Figure 9:
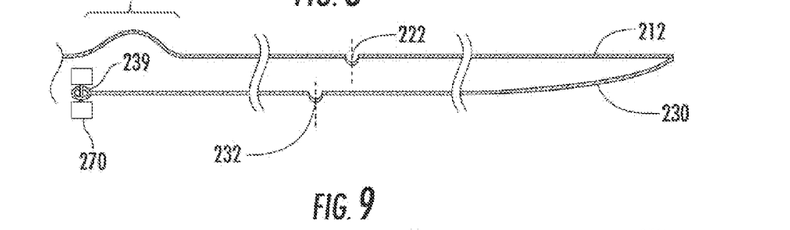
FIG. 9 is a partial, cross section exploded view of an airbag cushion in a second stage according to an exemplary embodiment.

FIG. 9 depicts the relative positions of the first cushion panel 212, valve panel 230, vent aperture 222, and valve aperture 232 during the second stage of deployment. Between the first stage of deployment and the intermediate stage of deployment, the valve panel 230 is configured to move from the first position to the second position. The airbag cushion 210 inflates and pulls on the first cushion panel 212, thus sliding the first cushion panel 212 distally or away from the airbag housing 240 relative to the valve panel 230, such that the valve panel 230 is in the second position with the venting closed. Substantially all of the slack in the valve panel 230 is removed, such that the valve panel 230 is held in tension between its first end 236 and second end 238, which are coupled to the first end 226 of the first cushion panel 212 and the latch mechanism 270, respectively. Because the first cushion panel 212 had more slack (i.e., between its second end 226 and the vent apertures 222) than the valve panel 230 (i.e. between its first end 236 and the valve apertures 232) in the first position, the first cushion panel 212 continues to have slack in the second position.

As with the embodiment described above, if the airbag cushion 210 encounters an occupant out-of-position or other atypical occupant during the first stage of deployment, the venting of the airbag cushion 210 is configured to remain open (i.e., the valve panel 230 remains in the first position and the intermediate stage of deployment is not reached). Because the airbag cushion 210 encounters the occupant, the venting is configured to release inflation gas before the airbag cushion 210 can inflate sufficiently to pull on the first cushion panel 212 to close the venting.

Figure 10:
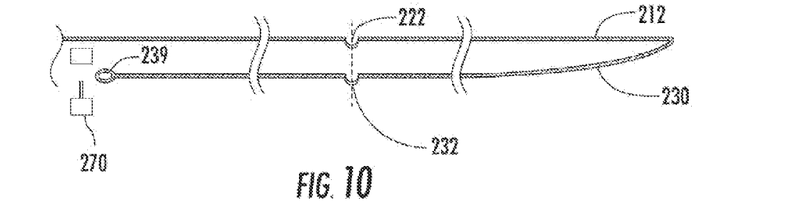
FIG. 10 is a partial, cross section exploded view of an airbag cushion in a third stage according to an exemplary embodiment.

FIG. 10 depicts the relative positions of the first cushion panel 212, valve panel 230, vent aperture 222, and valve aperture 232 during the third stage of deployment. Between the intermediate stage of deployment and the final stage of deployment, the valve panel 230 is configured to move from the second position to the third position. The latch mechanism 270 releases the second end 238 of the valve panel 230, thus allowing the airbag cushion 210 to continue to inflate and remove the slack from the first cushion panel 212. As the slack is removed, the airbag cushion 210 pulls on the first end 236 of the valve panel 230, thus sliding the valve panel 230 back into the first position where the venting is open (i.e., the valve apertures 232 are realigned with the vent and guide apertures 222, 262).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the crash test dummies as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag system, comprising:
   an airbag cushion including an inlet and an inflatable chamber;
   wherein the airbag cushion is stored in a housing;
   an inflator for providing inflation gas for the airbag cushion, the inflator being coupled to the housing and in fluidic communication with the inlet; and
   a valve panel including a first end coupled to the airbag cushion at a location generally opposite the inlet and a second end releasably coupled to a latch mechanism;
   wherein the latch mechanism is coupled to the housing, wherein the airbag cushion includes one or more vent apertures to allow gas to escape out of the inflatable chamber, and the valve panel includes one or more valve apertures;
   wherein the valve panel is disposed generally adjacent a surface of the airbag cushion, and during deployment of the airbag cushion the valve panel is configured to slide relative to the airbag cushion from a first position to a second position and, after being released by the latch mechanism, to a third position; and
   wherein in the first position, the airbag cushion and the valve panel each have slack, the airbag cushion having a greater amount of slack than the valve panel; and
   wherein in the second position, the airbag cushion has slack and the valve panel is in tension, and release of the valve panel by the latch mechanism allows the valve panel to slide relative to the airbag cushion from the second position to the third position.

2. The airbag system of claim 1, wherein in the first position at least one of the one or more valve apertures is aligned with at least one of the one or more vent apertures;
   wherein in the second position, the valve panel covers at least one of the one or more vent apertures is covered by the valve panel; and
   wherein in the third position, at least one of the one or more valve apertures is aligned with at least one of the one or more vent apertures.

3. The airbag system of claim 1, wherein the valve panel is configured to move passively from the first position to the second position by inflation of the chamber;
   wherein in the second position, the valve panel is configured to be in tension between the airbag cushion and the latch mechanism; and,
   wherein the valve panel is configured to move actively from the second position to the third position by release of the valve panel by the latch mechanism.

4. The airbag system of claim 1 further comprising a guide panel, wherein the guide panel is coupled to the airbag cushion and is configured to hold the valve panel generally adjacent the surface of the airbag cushion.

5. The airbag system of claim 4, wherein the valve panel is disposed generally inside the chamber.

6. The airbag system of claim 1, wherein the number of vent apertures is less than the number of valve apertures;
   wherein in the first position, each vent aperture is aligned with one valve aperture of a first group of valve apertures;
   wherein in the second position, each vent aperture is at least partially aligned with a portion of vent panel material; and
   wherein in the third position, each vent aperture is aligned with one valve aperture of a second group of valve apertures, the second group of valve apertures having at least one valve aperture not in the first group of valve apertures.

7. The airbag system of claim 6, wherein the airbag cushion includes six approximately 1 inch vent apertures arranged in a 3×2 pattern and spaced at approximately one inch intervals; and
   wherein the valve panel includes eight 1 inch valve apertures arranged in a 4×2 pattern and spaced at approximately one inch intervals.

8. The airbag system of claim 6, wherein in the second position, at least one valve aperture is disposed closer to the first end than each of the vent apertures.

9. The airbag system of claim 1, wherein in the first position, the airbag cushion has slack between the first end and the vent apertures, and the valve panel has slack between the latch mechanism and the valve apertures;
   wherein in the second position, the airbag cushion has slack between the first end and the vent apertures, and the valve panel is generally in tension between the first end and the latch mechanism; and
   wherein in the third position, the valve panel not coupled to the latch mechanism.

10. The airbag system of claim 1, wherein the number of vent apertures is the same as the number of valve apertures;
    wherein in the first position, the valve aperture and the vent aperture are aligned;
    wherein in the second position, the vent aperture is at least partially aligned with a portion of vent panel material; and
    wherein in the third position, the valve aperture and the vent aperture are aligned.

11. The airbag system of claim 10, wherein the vent aperture is approximately 2.75 inches in diameter, and the valve aperture is approximately 2.75 inches in diameter.

12. The airbag system of claim 10, wherein in the second position, the vent aperture is disposed closer to the first end than the valve aperture.

13. The airbag system of claim 1, wherein the in the first position, the airbag cushion has slack between the housing and the vent apertures, and the valve panel has slack between the first end and the valve apertures;
    wherein in the second position, the airbag cushion has slack between the housing and the vent apertures, and the valve panel is generally in tension between the first end and the latch mechanism; and
    wherein in the third position, the valve panel is not coupled to the latch mechanism.

14. The airbag system of claim 1, wherein during inflation of the airbag cushion, the valve panel is configured to move relative to the vent panel sequentially from the first position that allows venting of the airbag cushion, to the second position that prevents venting of the airbag cushion, and to a third position that allows venting of the airbag cushion.

15. The airbag system of claim 14, wherein the airbag cushion is configured such that during a first stage of deployment, if the airbag cushion encounters an occupant while the valve panel is in the first position, the valve panel remains in the first position throughout release of inflation gas from the inflator.

16. The airbag system of claim 14, wherein the airbag cushion is configured such that, if the airbag cushion does not encounter an occupant during the first stage of deployment, the airbag cushion proceeds to a second stage of deployment in which the valve panel is in the second position and the airbag cushion rapidly inflations toward the occupant, and the airbag cushion proceeds to a third stage of deployment in which the valve panel is in the third position to allow release of inflation gas from the airbag cushion and provide ride down for the occupant.

17. An airbag cushion, comprising:
   a first cushion panel and a second cushion panel coupled together to define an inlet and a chamber; and
   a generally elongate valve panel disposed within the chamber and positioned generally adjacent an interior surface of the first cushion panel;
   wherein the valve panel includes a first end coupled to the first cushion panel generally opposite the inlet, a second end configured to be releasably coupled to a vehicle, and one or more valve apertures;
   wherein the first cushion panel includes one or more vent apertures;
   wherein during deployment, the valve panel is configured to move relative to the first cushion panel from a first position to a second position and, after being released from the vehicle, to a third position, wherein the first position is different than the second position, and the second position is different from the third position; and
   wherein release of the valve panel allows the airbag cushion to continue to inflate and remove slack from the first cushion panel.

18. The airbag cushion of claim 17, wherein in the first position, the one or more vent apertures are generally aligned with at least a portion of the valve apertures;
   wherein in the second position, the vent apertures are generally not aligned with the valve apertures; and
   wherein in the third position, the vent apertures are generally aligned with at least a portion of the valve apertures.

19. The airbag cushion of claim 18, wherein the first position is not the same as the third position; and
   wherein at least a portion of the valve apertures aligned with the vent apertures in the first position are different than the valve apertures aligned with the vent apertures in the third position.

20. The airbag cushion of claim 17, wherein the valve panel is configured to move from the first position to the second position due to inflation of the airbag cushion; and
   wherein the valve panel is configured to move from the second position to the third position due to inflation of the airbag cushion only if the second end of the valve panel is released from the vehicle.

21. The airbag cushion of claim 20, wherein the valve panel is configured to not move from the first position if the airbag encounters an occupant before moving to the second position.

* * * * *